Figures 1, 2:
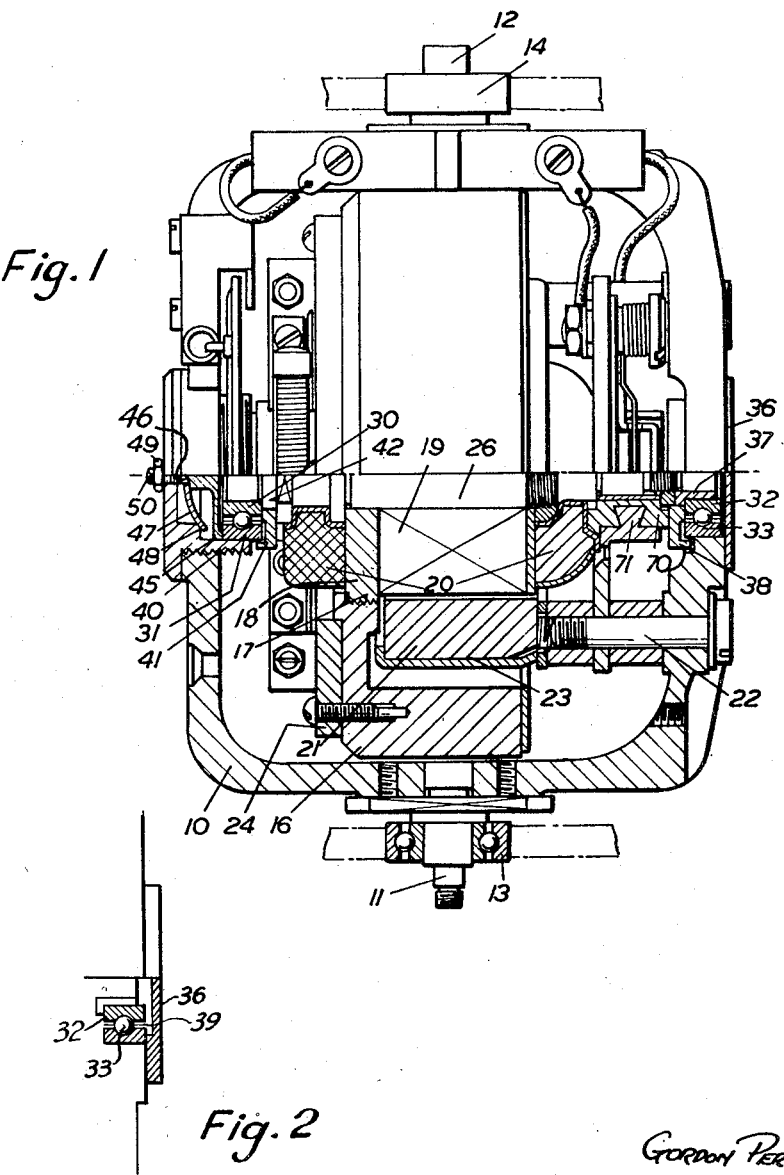

Feb. 19, 1957 G. P. WRIGHT 2,782,078
GYROSCOPIC APPARATUS
Filed July 24, 1953

Inventor
GORDON PERCY WRIGHT
By
Attorneys

United States Patent Office 2,782,078
Patented Feb. 19, 1957

2,782,078

GYROSCOPIC APPARATUS

Gordon Percy Wright, Hillington, Glasgow, Scotland, assignor to Kelvin & Hughes Limited, Glasgow, Scotland, a company of Great Britain Application July 24, 1953, Serial No. 370,072

Claims priority, application Great Britain February 10, 1953

3 Claims. (Cl. 308—178)

This invention relates to gyroscopic apparatus for example turn and slip indicators and other aircraft instruments having a gyro rotor spindle mounted at each end in a ball bearing carried in a gimbal ring, said bearings comprising inner and outer races having balls between them. It has been found that the ball bearings will frequently fail after a comparatively short period of operation e. g. a few hundred hours. On dismantling such bearings we have observed a reddish powder which is apparently iron oxide resulting from fretting corrosion. With a view to ensuring long life of such bearings it has heretofore been the practice to achieve the greatest accuracy and minimum free play between the parts. We have however now found that by leaving considerable play for relative axial movement of the inner and outer races of the bearings and resiliently urging the races towards each other, a remarkably long bearing life can be achieved.

According to the present invention therefore the races are axially relatively movable to an extent of five to fifteen thousandths of an inch, and means are provided for holding the races resiliently at one end of the limit of such axial movement.

The invention also comprises advantageous constructional means for carrying this resilient leading into effect.

In order that the invention may be readily understood and carried into effect, a constructional form thereof will now be described by way of example with reference to the accompanying diagrammatic drawing of which Figure 1 is a view partly in plan and partly in section of a gimbal ring and parts carried thereby suitable for an aircraft turn and slip indicator. Figure 2 is a fragmentary sectional view of a detail.

The gimbal ring 10 has spindles 11, 12 carrying bearings 13, 14 whereby it is to be mounted in the casing of the indicator.

A gyro rotor 16 is mounted by screw threads 17 on a flange 18 of a sleeve that carries the plates 19 and coil 20 of an armature. A permanent magnet 21 is mounted on the gimbal ring by bolts 22. The magnet carries a magnetic shield 23. The rotor carries a plate 24 on which the speed governor devices (not shown) are mounted.

The flange 18, armature, and rotor, are mounted on a spindle 26 the ends of which are mounted in the ball bearings one of which has inner and outer races 30, 31 and the other has inner and outer races 32, 33. These races and the corresponding balls are relatively dimensioned to leave free play such that 30 and 31 (and 32, 33) can move axially in relation to each other from five to fifteen thousandths of an inch.

The race 33 is located in a circular opening in the gimbal ring which is covered by a plate 36 which is screwed in position and is centrally recessed so as to be engaged only by the outer surface of the race 33 and not by the race 32 nor by the cage 39 of the balls.

A collet 37 fits on the end of the spindle 26 and within the race 32 and presses against the inner surface of the race 32 so as to take up the free play between the races 32, 33. A ring 38 surrounds the collet and spindle and is recessed also to engage only the inner surface of the race 32. The spindle has a shoulder that engages the inner end surface of the collet. Part 70 is the insulating support of the commutator 71.

At the other end of the spindle, the gimbal ring has a circular opening which is threaded to receive a screwed sleeve 40 in the inner end of which the race 31 is slidably mounted. A ring 41 surrounds the spindle and engages against an annular abutment 42 on the spindle. The ring 41 is recessed so as to engage only the inner surface of the race 30 without engaging the outer race 31. A plate 45 within the sleeve 40 is recessed so as to engage only the outer surface of the outer race 31 without engaging the cage or the inner race. The plate 45 has an outwardly extending central spigot 46 that passes through a central hole in a plate spring 47 that has three radial arms. The spring 47 is located against an annular shoulder on the spigot and the radial arms are engaged by an annular shoulder 48 on the sleeve 40 whereby the spring is loaded so that the plate 45 presses the race 31 inwardly to take up the axial free play in the bearing 30, 31 and at the same time applies resilient pressure through the parts 41, 26 and 37 on to the race 32 so as also to take up the axial free play in the bearing 32, 33.

The sleeve 40 is in the form of a cap and nuts such as 49 screw on to grubscrews 50 to fix the cap in position.

I claim:

1. A gyroscopic apparatus comprising a gyro rotor spindle mounted at each end in a ball bearing carried in a gimbal ring, said bearings comprising inner and outer races having balls between them, said races being axially relatively movable to an extent of five to fifteen thousandths of an inch, and holding means for holding the races resiliently at one end of the limit of such axial movement, said balls being spaced by cages, said holding means comprising plates engaging the outer surfaces of the said outer races, said plates being centrally recessed so as to avoid contact with the said cages and the said inner races, said holding means further including rings engaging the inner surfaces of the said inner races, said rings being centrally recessed to avoid engaging the said outer races.

2. An apparatus as claimed in claim 1 having a sleeve threaded into the said gimbal ring at one of said ends of the said spindle and slidably supporting an outer race, a plate spring, means engaging the outer race and carrying said plate spring at the central part of the spring, and abutment means on said sleeve engaging said spring at a point removed from its center thereby to load said spring centrally towards the bearing.

3. A gyroscopic apparatus comprising a gyro rotor spindle mounted at each end in a ball bearing carried in a gimbal ring, said bearings comprising inner and outer races having balls between them, said races being axially relatively movable to an extent of five to fifteen thousandths of an inch, and holding means for holding the races resiliently at one end of the limit of such axial movement, a plate attached to the said gimbal ring at one end of the said spindle, said plate engaging the adjacent outer race without engaging the inner race, a ring surrounding the spindle at the same end and engaging the adjacent inner race without contacting the outer race, a ring surrounding the spindle at the other end and engaging the inner surface of the adjacent inner race without contacting the outer race, a sleeve screwed into the gimbal ring at the latter end of the spindle in which sleeve the outer race is slidably mounted, a plate within said sleeve and engaging the outer surface of the outer race, an outwardly projecting central spigot on said last mentioned plate, a spring carried on said spigot, and an annular shoulder on said sleeve engaging said arms to apply resilient pressure through the spring on to said last mentioned plate.

References Cited in the file of this patent

UNITED STATES PATENTS

| | | |
|---|---|---|
| 1,156,188 | Sorensen | Oct. 12, 1915 |
| 1,773,427 | Larsh | Aug. 19, 1930 |
| 2,180,136 | Bates | Nov. 14, 1939 |
| 2,269,103 | Harding | Jan. 6, 1942 |

FOREIGN PATENTS

| | | |
|---|---|---|
| 534,890 | Great Britain | Mar. 21, 1941 |